United States Patent [19]
Mototani et al.

[11] Patent Number: 5,247,205
[45] Date of Patent: Sep. 21, 1993

[54] POWER SUPPLY APPARATUS

[75] Inventors: Shuuji Mototani; Mitsuo Nakamura, both of Kawasaki, Japan

[73] Assignee: Fujitsu Limited, Kanagawa, Japan

[21] Appl. No.: 736,042

[22] Filed: Jul. 25, 1991

[30] Foreign Application Priority Data

Jul. 26, 1990 [JP] Japan .................. 2-80080[U]

[51] Int. Cl.⁵ .............................................. H02J 9/00
[52] U.S. Cl. ............................. 307/66; 307/64; 307/23
[58] Field of Search ............... 307/11, 18, 19, 23, 307/43, 64, 66

[56] References Cited

U.S. PATENT DOCUMENTS

| | | | |
|---|---|---|---|
| 4,528,459 | 7/1985 | Wiegel | 307/66 |
| 4,707,774 | 11/1987 | Kajita | 307/66 |
| 4,751,398 | 6/1988 | Ertz, III | 307/66 |
| 4,827,151 | 5/1989 | Okada | 307/66 |
| 4,908,790 | 3/1990 | Little et al. | 307/60 |
| 5,111,058 | 5/1992 | Martin | 307/66 |

FOREIGN PATENT DOCUMENTS 64-1433 1/1989 Japan .

OTHER PUBLICATIONS

*IBM Technical Disclosure Bulletin*, "Personal Computer System Smartswitch Battery Backup Controller", Oct. 1989, vol. 32, No. 5B, pp. 70-71.
*IBM Technical Disclosure Bulletin*, "Uninterruptable Power Source", Jun. 1975, vol. 18, No. 1, pp. 9-10.
*Elektrotechnik*, "USV mit Wachhund", Mar. 1989, vol. 71, No. 2, pp. 52 and 55.

*Primary Examiner*—Jeffre A. Gaffin
*Attorney, Agent, or Firm*—Welsh & Katz, Ltd.

[57] ABSTRACT

A power supply apparatus for supplying a direct current to a load includes a circuit breaker, and an AC/DC converter for converting an alternating current passed through the circuit breaker into a direct current. The direct current is supplied to the load. A battery supplies a direct current to the load when the AC/DC converter is in an abnormal state, and a switch is connected between the output of the AC/DC converter and the battery and between the load and the battery. Switch drive units control the switch in such a way that, when the circuit breaker is in an on state, the switch is turned on to connect the battery to the AC/DC converter and to the load. When the circuit breaker is in an off state, the switch is turned off to disconnect the battery from the load, whereby an unnecessary battery back up operation is prevented.

6 Claims, 5 Drawing Sheets

Fig. 5

| STATE | CIRCUIT BREAKER 1 | AUXILIARY CONTACT 5 | SHORT DETECTING CONTACT 9 | SWITCH 6b |
|---|---|---|---|---|
| (1) | ON | CLOSE | OPEN | ON (BATTERY BACKUP) |
| (2) | OFF | OPEN | OPEN | OFF |
| (3) | OFF | OPEN | CLOSE | ON (BATTERY BACKUP) |

POWER SUPPLY APPARATUS

BACKGROUND OF THE INVENTION

(1) Field of the Invention

The present invention relates to a power supply apparatus having a back-up battery for supplying a power to a load, which power supply apparatus is used in, for example, computers.

Computers are now required to continue operation even when a power failure or an instantaneous power cut occurs, and to this end, various back-up method are conventionally provided.

(2) Description of the Related Art

In the conventional power supply apparatus for supplying a power to a load, a back-up battery is directly connected to the output of an AC/DC converter. During a period when the AC/DC converter generates a DC current, the battery is charged up, and when the AC/DC converter does not generate a DC current, the charged-up battery supplies power to the device.

When a work in the load is finished, and when an operator manually turns off a circuit breaker for turning the power supply apparatus on or off, the output from the AC/DC converter becomes zero volts and the situation becomes the same as that when a power failure occurs, with the result that the battery automatically executes a back up operation.

Therefore, even when a power failure or a fault in the AC/DC converter does not occur, the back-up operation is executed every time the circuit breaker is manually turned off, and this causes a problem in that the shortening the life of the battery is accelerated.

SUMMARY OF THE INVENTION

An object of the present invention is to provide a power supply apparatus in which the shortening of the life of a back-up battery is suppressed as much as possible.

To attain the above object, according to the present invention, there is provided a power supply apparatus for supplying a direct current to a load, comprising: a circuit breaker for closing and opening a circuit between separable contacts under both normal and abnormal operating conditions; an AC/DC converter, connected to the circuit breaker and to the load, for converting an alternating current passed through the circuit breaker into a direct current, the direct current being supplied to the load; and a battery for supplying a direct current to the load when the AC/DC converter is in an abnormal state. Further, in the power supply apparatus, there is provided a switch connected between the output of the AC/DC converter and the battery and between the load and the battery; and a switch drive unit, operatively connected to the circuit breaker, for driving the switch in such a way that, when the circuit breaker is in an on state, the switch is turned on to connect the battery to the AC/DC converter, and when the circuit breaker is in an off state, the switch is turned off to disconnect the battery and the load.

The battery and the switch are connected in series between one polarity output and another polarity output of the AC/DC converter.

The switch driving unit comprises an auxiliary contact and a relay connected in series between one polarity output and another polarity output of the AC/DC converter. The auxiliary contact is closed when the circuit breaker is in an on state, and the auxiliary contact is open when the circuit breaker is in an off state. The relay turns on the switch when the auxiliary contact is closed, and turns off the switch when the auxiliary contact is opened.

According to another aspect of the present invention, the power supply apparatus further comprises an over current detecting unit, operatively connected to the circuit breaker and to the switch driving unit, for detecting an over current flowing through the circuit breaker (1). In response to the detection of an over current by the over current detecting unit, the switch drive unit turns on the switch to connect the battery to the load.

The over current detecting unit comprises a short detecting contact and a relay connected in series between one polarity and another polarity of the outputs of the AC/DC converter. The short detecting contact is closed so that the relay turns on the switch when the circuit breaker is turned off due to an over current flowing through the circuit breaker.

BRIEF DESCRIPTION OF THE DRAWINGS

The above object and features of the present invention will be more apparent from the following description of the preferred embodiment with reference to the accompanying drawings, wherein:

FIG. 5 is a diagram showing a table for explaining the operation of the power supply apparatus shown in FIG. 3 or shown in FIG. 4.

DESCRIPTION OF THE PREFERRED EMBODIMENTS

For a better understanding of the present invention, a conventional power supply apparatus is first described with reference to FIGS. 1 and 2.

Figure 1:
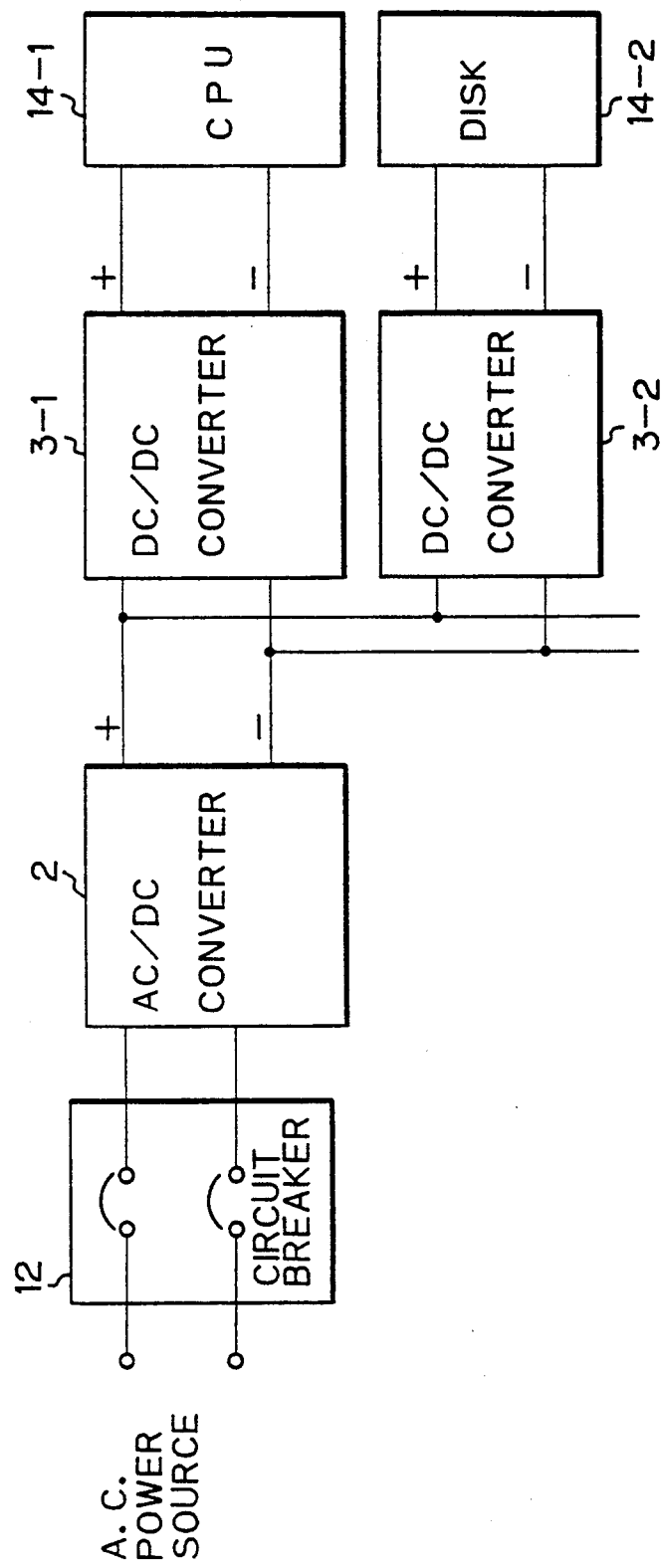
FIG. 1 is a block diagram showing a conventional power supply apparatus for explaining the field of utilization in industry.

FIG. 1 shows a conventional power supply apparatus for supplying a voltage to a central processing unit and a disk unit. In general, a computer system is constructed by a central processing unit (CPU), disk apparatus (DISK), and so forth, but the power supply voltages for the CPU, disk apparatus, and so forth are usually different; for example, a −5.3 V power supply is used for the CPU, and a 5 V power supply is used for the disk apparatus. Therefore, as shown in FIG. 1, DC/DC converters 3-1 and 3-2 are provided separately for a CPU 14-1 and the disk apparatus 14-2, respectively, to generate the necessary voltages to be applied thereto. Each of the DC/DC converters 3-1 and 3-2 is duplicated.

A single AC/DC converter 2 is commonly connected to the plurality of DC/DC converters, and converts a commercial voltage of 100 V or 200 V to a low voltage which is harmless to the human body. The converted voltage is then applied to the respective DC/DC converters.

Note that a circuit breaker 12 is turned off when an over current of the commercial power source flows through the circuit breaker, to protect the devices such as the CPU or the disk apparatus. To this end, the circuit breaker 12 includes, for example, a fuse (not shown in the figure) which will blow when an over current flows therethrough. Further, the circuit breaker 12 includes a switch (not shown in the figure) which is turned on or off manually at the beginning or the end of work in the CPU.

Computers are now required to be operated without stopping, and to this end, various conventional back-up methods have been provided.

In a power supply apparatus, when a fault occurs in the AC/DC converter 2 or the DC/DC converters 3-1 and 3-2, so that the output voltage of the AC/DC converter 2 or the output voltage of the DC/DC converter 3-1 or 3-2 becomes zero volts, the loads such as the CPU 14-1 and the disk apparatus 14-2 must be supplied with back-up voltages by some means, in order to continue the operation of the computers.

The DC/DC converters have a small size and are duplicated as back ups for each other. The AC/DC converter, however, has a large size because it uses a commercial power supply, and thus it is not preferable to duplicate over AC/DC converter as a back up for another.

Figure 2:
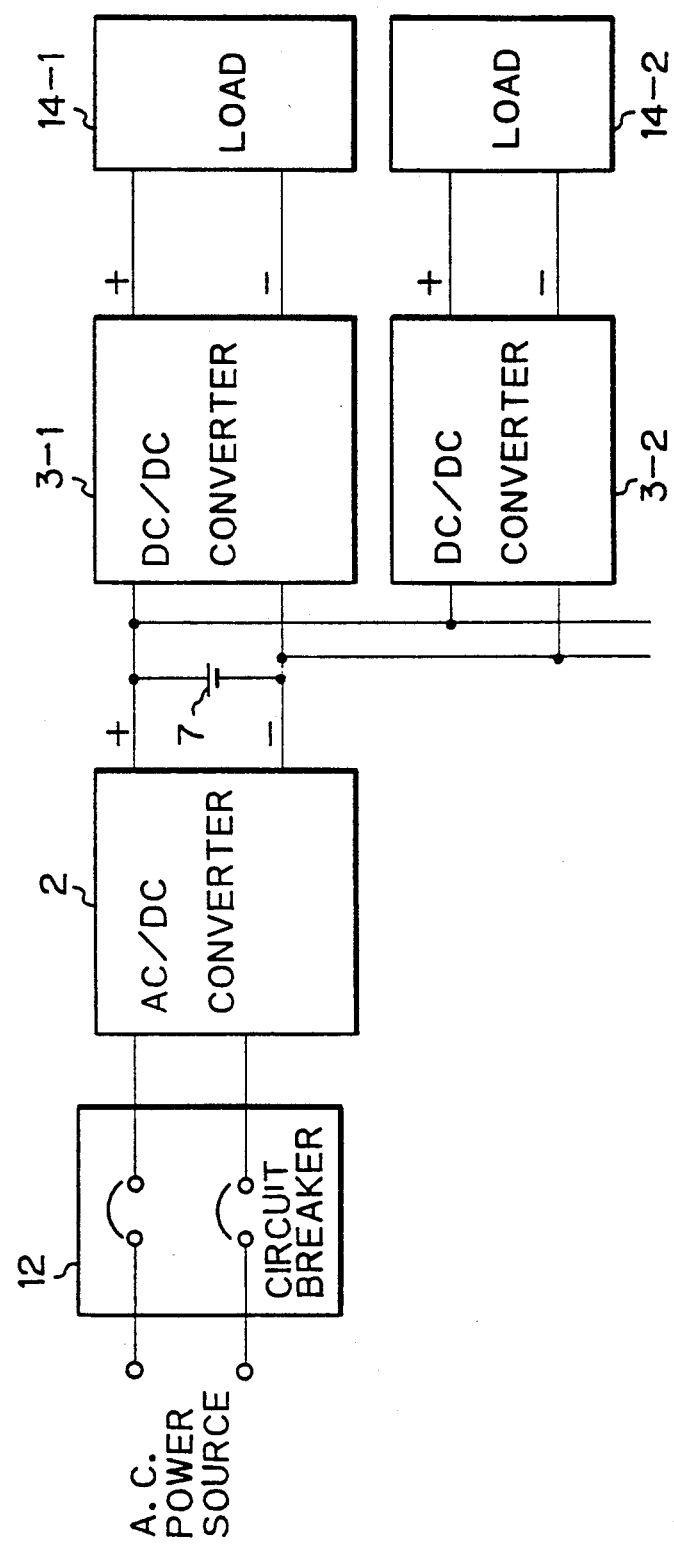
FIG. 2 is a block diagram showing a conventional power supply apparatus provided with a back-up battery.

FIG. 2 shows a conventional power supply apparatus provided with a back-up battery 7. As shown in FIG. 2, when a fault occurs in the AC/DC converter 2, the back-up battery 7 supplies a voltage to the DC/DC converters 3-1 and 3-2. In the apparatus shown in FIG. 2, also, the DC/DC converters are duplicated.

In operation, when the circuit breaker 12 is turned on, an alternating current power supply of 100 or 200 V is applied to the AC/DC converter 2 and is converted therein to a direct current having a low voltage. The converted direct current charges up the battery 7, and is also converted by the DC/DC converter 3 into the necessary voltages to be applied to a CPU 14-1 and a magnetic disk 14-2.

In this construction, when a power failure of the alternating power source occurs or when a fault occurs in the AC/DC converter 2, so that an output cannot be obtained therefrom, the AC/DC converter 2 is backed up by the battery 7.

When the work is finished, and when an operator manually turns off the circuit breaker 12, the output from the AC/DC converter 2 cannot be obtained, and therefore, the situation becomes the same as that when a power failure occurs or when a fault occurs in the AC/DC converter 2, with the result that the battery 7 automatically executes the back up operation.

Therefore, a problem arises in that, even when a power failure or a fault in the AC/DC converter does not occur, the back-up operation is executed every time the circuit breaker 12 is turned off, and thus the shortening of the life of the battery 7 is accelerated.

Now, embodiments of the present invention will be described.

Figure 3:
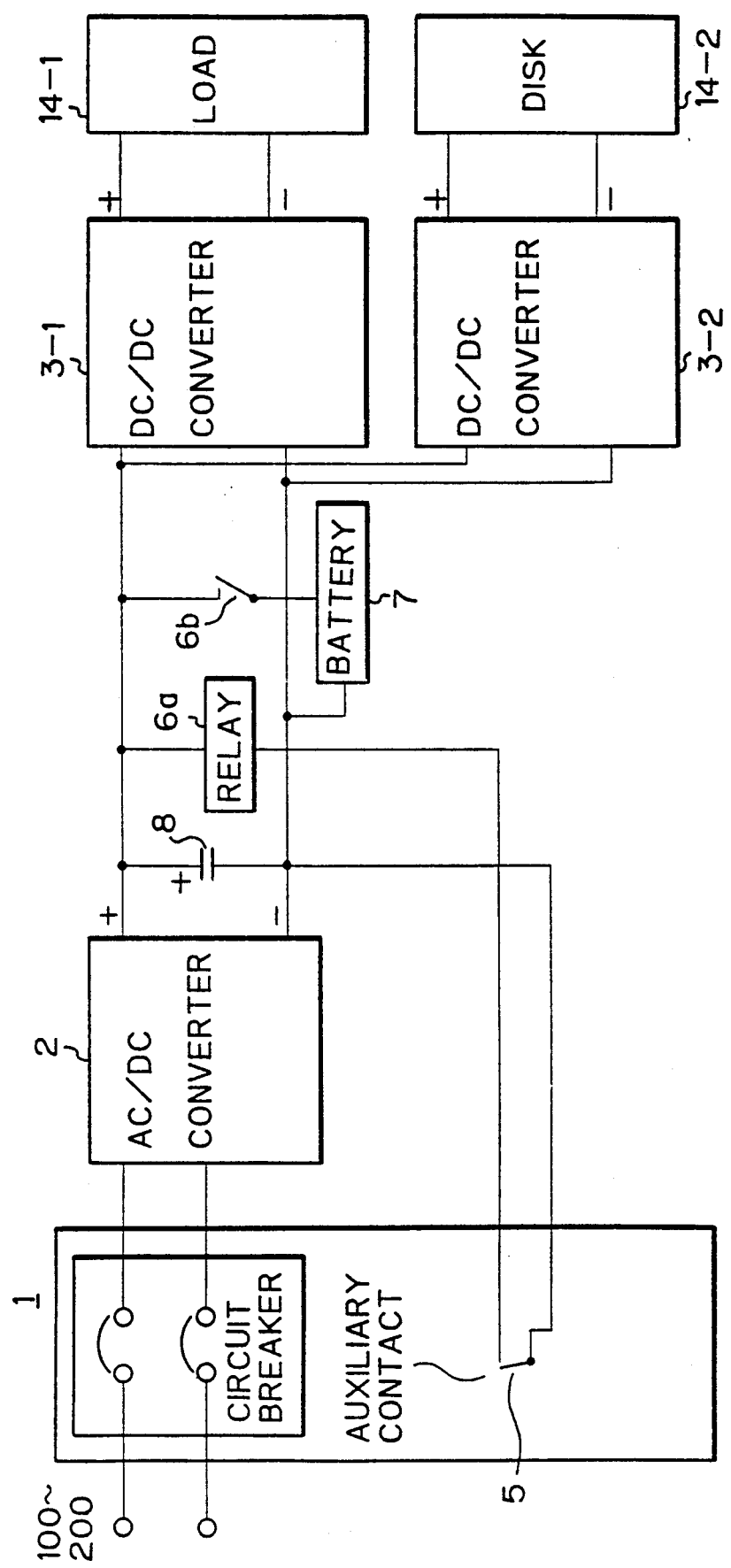
FIG. 3 is a block diagram showing a power supply apparatus according to an embodiment of the present invention.

FIG. 3 is a block diagram showing a power supply apparatus according to a first embodiment of the present invention. In the figure, 3-1 and 3-2 are DC/DC converters, 4-1 and 4-2 are loads such as a CPU or a magnetic disk apparatus, 5 is an auxiliary contact which is closed when the circuit breaker 1 is in on, and which is in an open when the circuit breaker 1 is off, 6a is a relay, 6b is a relay contact, and 8 is a smoothing capacitor. Each of the DC/DC converters 3-1 and 3-2 is duplicated.

The auxiliary contact 5 and the relay 6a are connected in series between the positive output and the negative output of the AC/DC converter 2.

When an alternating current is normally supplied to the circuit breaker 1, and when the circuit breaker 1 is turned on to start work, then the auxiliary contact 5 is automatically closed. The relay 6a causes the switch 6b to be closed when the auxiliary contact 5 is closed, and when the switch 6b is closed, the battery 7 is charged up by the output voltage of the AC/DC converter 2 during a normal condition, and the battery 7 supplies a DC current to the DC/DC converters 3-1 and 3-2 when the output of the AC/DC converter 2 is lost due to a power failure or a fault in the AC/DC converter 2.

Conversely, when the circuit breaker 1 is turned off manually at the end of the work, the auxiliary contact 5 is also automatically turned off, and thus the relay 6a opens the switch 6b. When the switch 6b is opened, the battery 7 is not charged-up and does not supply a DC current to the DC/DC converters 3-1 and 3-2, and therefore, the back-up operation is not effected by the battery 7. Before manually turning off the circuit breaker 1, data processed in the load 14-1 or 14-2 is saved into an non-volatile storage, and therefore, even when the back up operation is not effected by the battery 7, the data is not destroyed.

Note that, even when a power failure of the alternating current power source or an instantaneous cut of the alternating current power source occurs, the circuit breaker 1 is kept on so that the auxiliary contact 5a is also kept closed. Accordingly, the battery 7 remains connected to the DC/DC converters 3-1 and 3-2 and the back up is thus executed.

Accordingly, the acceleration of the shortening of the life of the battery can be prevented.

In the above construction shown in FIG. 1 however, when an over current flows through the circuit breaker 1, whereby the circuit breaker 1 is turned off, the auxiliary contact 5 is also automatically opened and the switch 6b is turned off by the relay 6a, and therefore, the back-up operation by the battery 7 cannot be effected. As a result, a problem arises in this case in that the data being processed by the load such as a CPU is destroyed.

Figure 4:
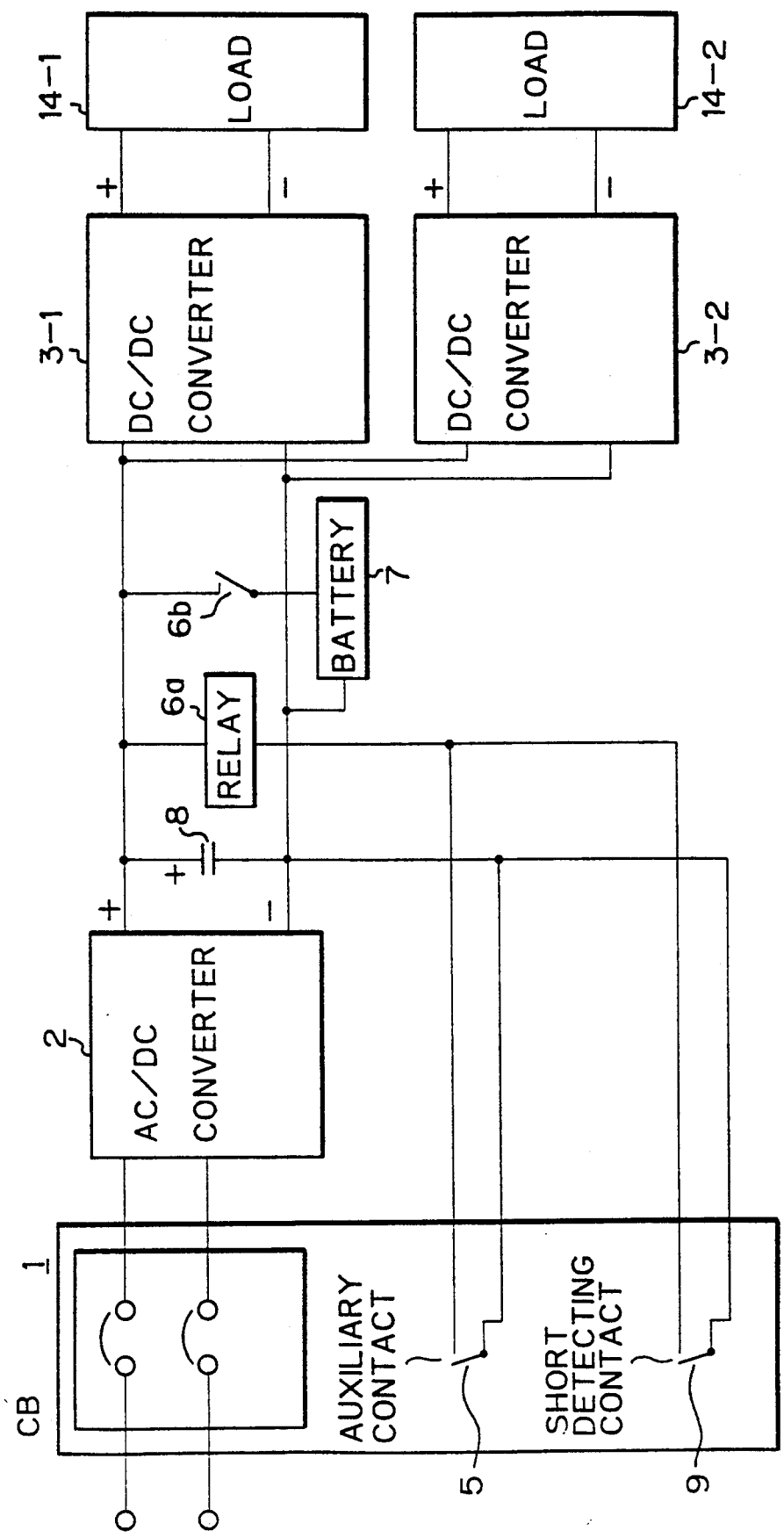
FIG. 4 is a block diagram showing a power supply apparatus according to another embodiment of the present invention.

To prevent this data destruction, a second embodiment of the present invention is provided as shown in FIG. 4.

In FIG. 4, a short detecting contact 9 is added to the embodiment shown in FIG. 3. Note that the auxiliary contact 5 and the short detecting contact 9 are included in the circuit breaker. Such a circuit breaker itself is known in the field of the market; for example, a circuit breaker is marked under the trade name, IEG series, by Sanken Air Packs K.K. Each of the DC/DC converters 3-1 and 3-2 is duplicated.

The short detecting contact 9 and the relay 6a are connected in series between the positive output and the negative output of the AC/DC converter 2.

The short detecting contact 9 is open while an over current does not flow through the circuit breaker 1, and is closed when an over current flows through the circuit breaker 1.

In operation, when an over current flows through the circuit breaker 1, the circuit breaker 1 is turned off and the auxiliary contact 5 is opened. But, in response to the over current, the short detecting contact 9 is closed and thus the relay 6a driving the switch 6b remains closed, and accordingly, the battery 7 backs up the AC/DC converter 2 by supplying a DC current to the DC/DC converters 3-1 and 3-2.

The relationships among the states of the circuit breaker 1, the auxiliary contact 5, the short detecting contact 9, and the relay contact 6b are shown in FIG. 5.

In FIG. 5, a state (1) is that when the circuit breaker 1 is in an on state in an normal condition; a state (2) is that when the circuit breaker is turned off manually, and a state (3) is that case when an over current flows through the circuit breaker 1 so that the circuit breaker 1 is turned off.

The addition of the short detecting contact 9 is effective in the state (3).

The respective states are explained as follows.

In the state (1), since the circuit breaker 1 is in an on state, the auxiliary contact 5 is closed. Also, since an over current is not flowing through the circuit breaker 1, the short detecting contact 9 is opened, and thus the switch 6b is in an on state. In this state, the battery 7 can back up the AC/DC converter 2.

In the state (2), since the circuit breaker 1 is turned off, the auxiliary contact 5 is opened. Also, since there an over current is not flowing through the circuit breaker 1, the short detecting contact 9 is opened, and thus the switch 6b is in an off state. Therefore, the charge in the battery 7 is not consumed.

In the state (3), since an over current is flowing therethrough, the circuit breaker 1 is turned off and the auxiliary contact 5 is opened. According to the first embodiment shown in FIG. 3, the switch 6b is turned off in response to an opening of the auxiliary contact 5, so that the back up operation is not effected and the apparatus will be stopped. In the second embodiment shown in FIG. 4, however, the short detecting contact 9 is closed in response to an over current, and thus, the relay 6a continues to be energized and the switch 6b remains in an on state. Accordingly, the back up operation is effected by the battery 7 and the data is not destroyed.

As described above, according to the present invention, by utilizing an auxiliary contact which is automatically turned on or off in response to an on or off state of the circuit breaker, an unnecessary back up can be prevented and a shortening of the life of the battery is suppressed. Also, by adding the short detecting contact, which is turned on in response to an over current flowing through the circuit breaker, a back up by the battery is possible even when the circuit breaker is turned off due to the over current.

We claim:

1. A power supply apparatus for supplying a direct current to a load, comprising:
    a circuit breaker;
    an AC/DC converter, connected to said circuit breaker and to said load, for converting an alternating current passed through said circuit breaker to a direct current, said direct current being supplied to said load;
    a battery for supplying a direct current to said load when said AC/DC converter is in an abnormal state;
    a switch connected between the output of said AC/DC converter and said battery and between said load and said battery; and
    switch drive means, operatively connected to said circuit breaker, for driving said switch in such a way that when said circuit breaker is on, said switch is turned on to connect said battery to said AC/DC converter and to said load, and when said circuit breaker is off, said switch is turned off to disconnect said battery from said load;
    said switch drive means including an auxiliary contact and a relay connected in series between one polarity output and another polarity output of said AC/DC converter, said auxiliary contact being closed when said circuit breaker is in an on state and said auxiliary contact being opened when said circuit breaker is in an off state, said relay turning on said switch when said auxiliary contact is closed, and said relay turning off said switch when said auxiliary contact is opened.

2. A power supply apparatus as claimed in claim 1 wherein said auxiliary contact is included in said circuit breaker.

3. A power supply apparatus for supplying a direct current to a load, comprising:
    a circuit breaker;
    an AC/DC converter, connected to said circuit breaker and to said load, for converting an alternating current passed through said circuit breaker to a direct current, said direct current being supplied to said load;
    a battery for supplying a direct current to said load when said AC/DC converter is in an abnormal state;
    a switch connected between the output of said AC/DC converter and said battery and between said load and said battery;
    switch drive means, operatively connected to said circuit breaker, for driving said switch in such a way that when said circuit breaker is on, said switch is turned on to connect said battery to said AC/DC converter and to said load, and when said circuit breaker is off, said switch is turned off to disconnect said battery from said load; and
    an over current detecting means, operatively connected to said circuit breaker and to said switch drive means, for detecting an over current flowing through said circuit breaker,
    said switch drive means turning on said switch in response to the detection of an over current by said over current detecting means.

4. A power supply apparatus as claimed in claim 3, wherein said over current detecting means comprises a short detecting contact and a relay connected in series between one polarity and another polarity of the outputs of said AC/DC converter, said short detecting contact being closed when said circuit breaker is turned off due to an over current flowing through said circuit breaker, to thereby energize said relay so that said switch is turned on.

5. A power supply apparatus as claimed in claim 4, wherein said battery and said switch are connected in series between one polarity output and another polarity output of said AC/DC converter.

6. A power supply apparatus as claimed in claim 5, wherein said switch drive means comprises an auxiliary contact and said relay connected in series between one polarity output and another polarity output of said AC/DC converter, said auxiliary contact being closed when said circuit breaker is in an on state and said auxiliary contact being opened when said circuit breaker is in an off state, said relay turning on said switch when said auxiliary contact is closed, and said relay turning off said switch when said auxiliary contact is opened.

* * * * *